Aug. 28, 1956 — R. C. RUPP — 2,760,293
FISHING LURE
Filed Oct. 8, 1953
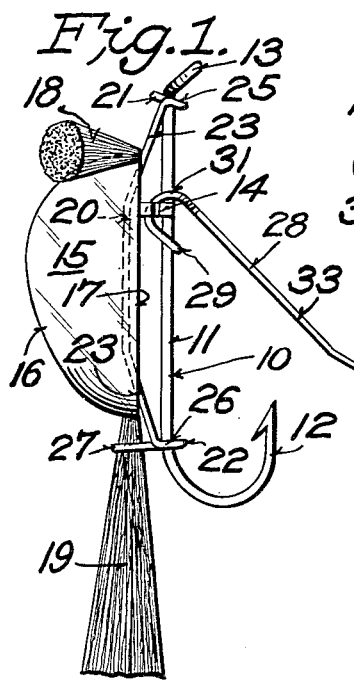
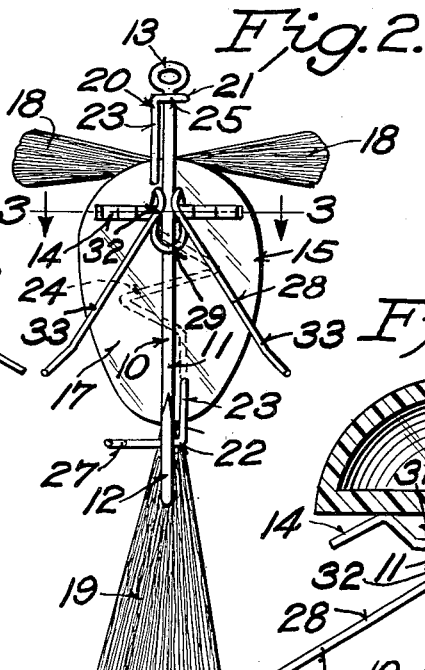
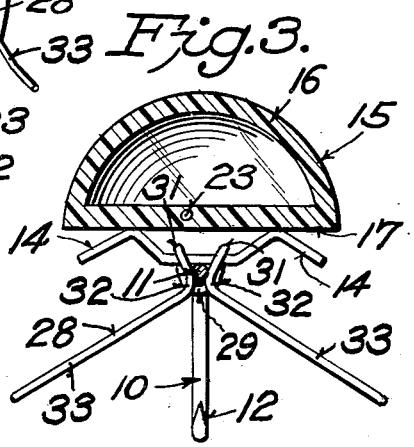
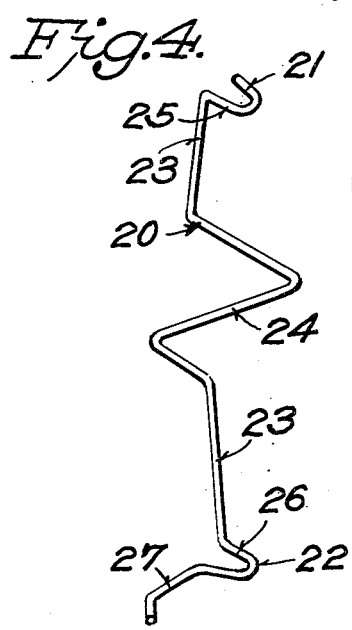
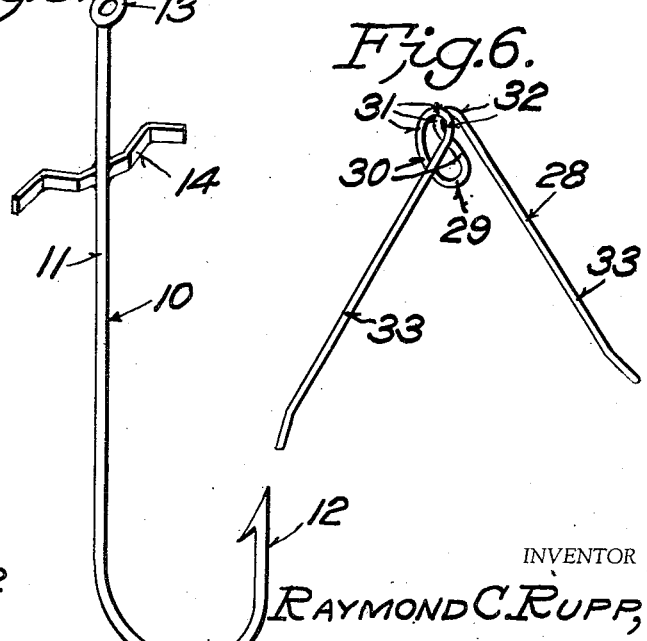
INVENTOR
RAYMOND C. RUPP,
BY H. B. Ibellson & Co.
ATTORNEY United States Patent Office 2,760,293
Patented Aug. 28, 1956

2,760,293

FISHING LURE

Raymond C. Rupp, Fort Wayne, Ind.

Application October 8, 1953, Serial No. 385,016

3 Claims. (Cl. 43—42.38)

This invention relates to fishing lures in the bass bug class generally used in fly rod fishing.

Lures of this character have bodies of various kinds and shapes and with various decorations of hair or feathers, the bodies being permanently fastened to the fish hooks; and hence if a fisherman desires to try his luck with a different design of lure, he must detach the one he is using from the fishing line and apply the desired one. One object of the invention is to do away with that procedure by providing a simple and practical detachable connection between the hook and the lure body so that any one of a number of lure bodies of different designs and sizes may be quickly and easily applied to the hook without removing the latter from the fishing line.

Another object of the invention is to provide a fishing lure of such construction that it will float on the top of water without greasing.

A further object is to provide for a fishing lure of the above indicated character, an improved weed guard for the hook, the guard being such that it may be quickly applied when needed and as readily removed when not desired.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is a side view of the improved fishing lure showing the weed guard applied thereto;

Fig. 2 is a view of the underside or bottom of the structure shown in Fig. 1;

Fig. 3 is a cross section taken on the line 3—3 in Fig. 2;

Fig. 4 is a perspective view of a wire reinforcing and fastening member which coacts with the fish hook;

Fig. 5 is a perspective view of the improved fish hook; and

Fig. 6 is a perspective view of the improved weed guard.

Referring more in detail to the drawings the numeral 10 denotes as a whole the fish hook, the latter having a straight shank 11, the usual barbed end 12 and the usual line attaching eye 13 as its opposite end. Suitably fixed to the intermediate portion of the shank 11 is a cross bar 14 to provide a relatively flat transverse area for the purpose of preventing the body of the lure from turning or rotating about the shank and to assist in holding the detachable weed guard on the lure as later described.

The body member 15 of the lure may be of any shape and size but as shown it is of elongated form and has a top 16 which is curved both longitudinally and transversely and a bottom 17 which is flat or at least has a flat transverse area in opposed relation to the arms of the cross bar 14. While the latter may be straight, it preferably has its arms angled, that is, bent laterally in a plane at right angles to the axis of the shank 11, to provide two spaced points of contact with the bottom 17 as shown in Fig. 3. The purpose of these angular projections or humps will be presently explained. The body is hollow and preferably made of celluloid or other plastic material. It may be variously colored and its outer surface may be variously decorated. At its front or head portion may be suitably fastened hairs, feathers or other decorations 18 and similar decorations 19 may be applied to its rear or tail portion, as suggested in Figs. 1 and 2.

The detachable connection between the lure body and the fish hook preferably comprises a metal member 20 which is embedded in or otherwise fixed to the bottom 17 and which has at one end a hook 21 to engage the shank 11 adjacent the eye 13 and at its other end a somewhat similar hook 22 to engage the shank adjacent the bent and barbed end 12 of the hook. The fastening member 20 may be formed of a piece of resilient wire and has a body portion 23, the intermediate portion of which is bent back and forth into zig-zag form as at 24. The upper part of the member 20 forms an upwardly projecting resilient arm and is bent at right angles to form a short arm 25 with a bent portion forming the hook 21. The lower part of the member 20 forms a downwardly projecting resilient arm and is also bent at right angles to form a short arm 26, the latter being then bent to form the hook 22. The free end of the hook 22 is angularly bent to form a finger piece 27. The zigzag part 24 of the member is disposed in a single plane and is molded in the center of the bottom 17 of the plastic body of the lure. The remaining portions form the longitudinally extending arms which are slightly angled with respect to the central portion 24 and extend out of the upper and lower ends of the body 15, as seen in Fig. 1. The member is of substantially greater length than the body 15 and the short arms 25 and 26 project laterally in a rearward or downward direction from the body 15 at or adjacent the ends of the latter, as shown in Figs. 1 and 2. The length of the body 15 is slightly less than the length of the straight portion of the shank 11, and the resilient arms with their hooks 21 and 22 may be so dimensioned that the hooks engage the shank with a snap action and will frictionally engage the shank and normally hold the lure body against shifting longitudinally of the shank. It will be noted that the body will have a rocking action on the humps of the arms of the cross bar when the fastener elements 21 and 22 are being applied to the shank, and that the body will be held under tension against the humps. The engagement of the arms of the cross bar 14 with the flat area of the lure bottom will prevent the body from rotating on the hook. In applying the body, the hook 21 is first engaged with the upper portion of the shank of the fish hook, and then the hook 22, by means of the finger piece 27, is sprung or snapped onto the lower portion of the shank.

When it is desired to fish among weeds, the improved weed guard 28 shown in Fig. 6 may be applied to the fish hook as seen in Figs. 1, 2 and 3. This guard is made from a single piece of fine resilient wire bent upon itself at its middle to form a loop 29 which extends around and engages the rear of the shank 11 below the cross bar. The two side portions or arms 30 of this substantially U-shaped loop converge toward each other and are then bent upon themselves to form two laterally spaced loops 31 which extend over and partially around the arms of the cross bar 14 on opposite sides of the hook shank. The free ends of the loops 31 are first bent toward each other to form shank gripping portions or jaws 32 and from the latter the end portions of the wire extend in outwardly diverging relation to form the substantially straight guard arms 33. The space between the jaws 33 is less than the diameter of the shank 11. The guard device is applied, when the body 15 is off of the fish hook, by snapping its portions 32 over the shank below the cross bar, and then swinging the arms 33 over the top of the cross bar 14. The device is then rotated about the arms of the bar until the jaws 32 snap across the shank of the fish hook above the cross bar and the loop 29 engages the rear of the shank 11. The parts are so dimensioned that the guard snaps into the position shown in Figs. 1, 2 and 3 and will be held in that position by the spring action of the jaws and the engagement of the loop 29 with the shank and the loops 31 with the cross bar. The guard will be prevented from shifting longitudinally of the fish hook and from rotating about its shank, so that the resilient diverging guard arms 33 will be properly disposed to deflect weeds from the hook 12. It will be noted that the cross bar or member 14 is disposed in a plane at right angles to the plane of the curved and barbed end 12 of the hook so that the weed deflecting arms 33 will be properly positioned with respect to that end, and the body 15 will be held at the top or front side of the shank 11, that is, on the side opposite the direction in which the end 12 extends.

It will be seen that I have provided a fish hook with a cross member which serves the double purpose of removably fastening a weed guard on the shank and holding a detachable lure body against rotation about the shank as an axis. In order to use the weed guard, the lure body must be made detachable from the fish hook, but the detachability of the lure body is highly advantageous, whether or not the weed guard is used, since a fisherman may quickly and easily substitute one design of lure body for another without removing the hook from the fishing line, thus saving much time and trouble. It will also be seen that by applying a worm or other bait to the hook 12, the fish hook may be used with the weed guard and without the body 15.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. In a fishing lure, a fish hook having a straight shank and a barbed curved end, a lure body disposed along the shank and having a flat bottom area between its upper and lower ends, a cross member fixed to the shank adjacent said flat area and having laterally projecting portions to engage the flat area and space the body from the shank, said portions defining fulcrum means about which said body may tilt with respect to the shank, said cross member preventing the body from rotating about the longitudinal axis of the shank, and quick detachable means for fastening the body on the shank, said means comprising upper and lower fastener elements projecting from the opposite ends of the body and provided with laterally extending hooks engaged with said shank above and below said cross member, at least one of said elements being an arm of resilient material extending endwise from the body and having one of the lateral hooks at its projecting end, said arm being flexed to engage said one hook with the shank and being under tension when each said hooks are engaged with the shank to hold the body under tension against said projecting portions of the cross member.

2. In a fishing lure, a fish hook having a straight shank with a barbed curved end portion projecting from one side of the shank, a lure body with a flat bottom portion disposed along the shank on the side of the shank facing opposite said barbed curved end, a cross bar fixed to the shank between its ends and in opposed relation to the flat bottom portion of the body, the arms of said cross bar having laterally projecting humps engaged with said flat portion of the body and on which said body may tilt with respect to the shank, said cross member preventing the body from rotating about the longitudinal axis of the shank, and upper and lower fastener elements detachably connecting the body to the shank, said elements being resilient arms projecting beyond the ends of the body and having laterally extending hooks at their ends engaged with the shank above and below said cross bar at points spaced from the ends of the body, at least one of said resilient arms being flexed in applying the body to the shank to hold the body under tension against said humps on the cross bar.

3. The structure of claim 2 in combination with a weed guard detachably mounted on said shank and said cross bar, said weed guard being made of a piece of resilient wire bent at its center to form a substantially U-shaped loop to freely receive the shank at one side of said cross bar, the side portions of said loop being bent to provide two laterally spaced loops which extend around said cross bar on opposite sides of the shank and to provide opposed resilient jaw portions, the wire being then bent to provide diverging deflecting arms extending from said jaw portions, said jaw portions being normally spaced apart a distance less than the diameter of the shank whereby they will snap on to the shank and retain the guard thereon, the guard being prevented from sliding lengthwise of and rotating around the shank by its engagement with the cross bar.

References Cited in the file of this patent

UNITED STATES PATENTS

| 1,336,227 | Hayes | Apr. 6, 1920 |
| 1,778,119 | Neville | Oct. 14, 1930 |
| 1,929,150 | Peckingpaugh | Oct. 3, 1933 |
| 2,160,347 | Walsh | May 30, 1939 |
| 2,242,708 | Lancaster | May 20, 1941 |
| 2,315,575 | Austad | Apr. 6, 1943 |